United States Patent
Moxley et al.

(10) Patent No.: US 9,632,972 B1
(45) Date of Patent: Apr. 25, 2017

(54) DETERMINING INFLUENCE IN A SOCIAL COMMUNITY

(75) Inventors: Emily K. Moxley, San Francisco, CA (US); Vinod Anupam, Cupertino, CA (US); Hobart Sze, Mountain View, CA (US); Dani Suleman, Fremont, CA (US); Khanh B. Nguyen, Cupertino, CA (US)

(73) Assignee: Google Inc., Mountain View, CA (US)

( * ) Notice: Subject to any disclaimer, the term of this patent is extended or adjusted under 35 U.S.C. 154(b) by 1074 days.

(21) Appl. No.: 13/482,525

(22) Filed: May 29, 2012

Related U.S. Application Data

(60) Provisional application No. 61/491,600, filed on May 31, 2011.

(51) Int. Cl.
*G06F 15/16* (2006.01)

(52) U.S. Cl.
CPC ................................... *G06F 15/16* (2013.01)

(58) Field of Classification Search
CPC ....................................................... G06Q 50/01
USPC ................................................. 709/204, 207
See application file for complete search history.

(56) References Cited

U.S. PATENT DOCUMENTS

| | | | | |
|---|---|---|---|---|
| 8,359,276 B2* | 1/2013 | Zhuang | ................... | G06Q 10/10 705/319 |
| 9,081,823 B2* | 7/2015 | Luo | ......................... | G06Q 10/10 |
| 2006/0042483 A1* | 3/2006 | Work et al. | ..................... | 101/91 |
| 2006/0121434 A1* | 6/2006 | Azar | .............................. | 434/350 |
| 2007/0198510 A1* | 8/2007 | Ebanks | ................... | G06Q 30/02 |
| 2007/0214097 A1* | 9/2007 | Parsons | ............. | G06F 17/30864 706/12 |
| 2009/0222551 A1* | 9/2009 | Neely et al. | ................... | 709/224 |
| 2012/0324004 A1* | 12/2012 | Le et al. | ........................ | 709/204 |
| 2013/0311563 A1* | 11/2013 | Huberman | ............. | G06Q 50/01 709/204 |
| 2014/0258288 A1* | 9/2014 | Work | ..................... | G06Q 10/00 707/734 |

OTHER PUBLICATIONS

'The Klout Score' Klout [online]. [retrieved on May 29, 2012]. Retrieved from Internet electronic mail: <http://klout.com/corp/kscore>, 3 pages.
'Frequently Asked Questions' Klout [online]. [retrieved on May 29, 2012]. Retrieved from Internet electronic mail: <http://klout.com/corp/faq>, 5 pages.
'Klout' Wikipedia, the free encyclopedia [online]. [retrieved on May 29, 2012]. Retrieved from Internet electronic mail: <http://en.wikipedia.org/wiki/Klout>, 3 pages.

* cited by examiner

*Primary Examiner* — Bryan Lee
*Assistant Examiner* — Oluwatosin Gidado
(74) *Attorney, Agent, or Firm* — Fish & Richardson P.C.

(57) ABSTRACT

Methods, systems, and apparatus, including computer programs encoded on a computer storage medium, for determining influence in a social community. In one aspect, a method includes identifying a user in a community; determining an influence score to be associated with the user in the community for a particular topic, including: determining a reach of one or more communications that relate to the particular topic that have been distributed from the user to other users in the community, and evaluating the reach as compared to the reach of one or more communications distributed from other users in the community for the particular topic; and storing the influence score in association with the user.

22 Claims, 6 Drawing Sheets

400

TOP INFLUENCERS for PRODUCT1 — 410    Account ID: PRODUCER — 420
                                                            430

| Influencer | Score | Ranking | LABELS FOLLOWED |
|---|---|---|---|
| A | 81 | 1 | PRODUCT1 |
| C | 57 | 2 | PRODUCT2 |
| D | 36 | 3 | PRODUCER |
| B | 35 | 4 | OTHER PRODUCER |
| F | 12 | 5 | PRODUCT MARKET |
| E | 8 | 6 |  |
| 410A | 410B | 410C |  |

450 — Influencer Score by Topic        Account ID: A — 460

| Topic | Score | Ranking | Accounts |
|---|---|---|---|
| CES | 81,932 | 12 | A. Blog — 470 |
| Computers | 17,325 | 7,503 | A. Social Update |
| FiOS | 5,231 | 736 | A.1. Instant Message |
| Firmware | 504 | 3,028 | A.2. Instant Message |
| Mobile Phone | 14,722 | 613 |  |
| Parenting | 2,180 | 21,639 | Followers — 480 |
| Producer | 5,724 | 20 | 90,311   1st Degree Followers |
| Product | 251 | 81 | 735,921   2nd Degree Followers |
| Wrist Watch | 4,805 | 7 | 8,317,651  3rd Degree Followers |
| 450A | 450B | 450C |  |

FIG. 4B

DETERMINING INFLUENCE IN A SOCIAL COMMUNITY

RELATED APPLICATION DATA

This application claims the benefit under 35 U.S.C. §119(e) of U.S. Provisional Patent Application No. 61/491,600, entitled "Influential Nodes in a Social Graph," filed May 31, 2011; the disclosure of which is incorporated herein by reference in its entirety.

BACKGROUND

Social media is pervasive in today's society. Friends keep in contact throughout the day on social networks. Fans can follow their favorite celebrities and interact on blogs, micro-blogs, and the like. Such media are referred to as "social media," which can be considered media primarily, but not exclusively, for social interaction, and which can use highly accessible and scalable communication techniques. Brands and products mentioned on such sites can reflect customers' interests and feedback.

Some technologies have been developed to analyze social media. For example, some systems allow users to discover their "influence scores" on various social media. An influence score is a metric to measure a user's impact in social media.

SUMMARY

In general, one aspect of the subject matter described in this specification can be embodied in methods that include the actions of identifying a user in a community; determining an influence score to be associated with the user in the community for a particular topic including determining a reach of one or more communications that relate to the particular topic that have been distributed from the user in the community; evaluating the reach as compared to one or more other users in the community for the particular topic; and storing the influence score in association with the user.

In general, another aspect of the subject matter described in this specification can be embodied in methods that include the actions of identifying a user in a community; determining an influence score to be associated with the user in the community for a particular topic, including: determining a reach of one or more communications that relate to the particular topic that have been distributed from the user to other users in the community, and evaluating the reach as compared to the reach of one or more communications distributed from other users in the community for the particular topic; and storing the influence score in association with the user. Other implementations are disclosed, including implementations directed to systems, methods and apparatuses, computer-readable mediums and user interfaces.

Another aspect of the subject matter described in this specification can be embodied in methods that include the actions of determining, by one or more processors, an influence score to be associated with an entity for a particular topic for a community of users, including: determining a reach of one or more first communications that relate to the particular topic and the entity and that have been distributed from users to other users in the community, and evaluating the reach as compared to the reach of one or more second communications that relate to the particular topic and the distributed from other users in the community for the particular topic; and storing the influence score in association with the entity.

Particular embodiments of the subject matter described in this specification can be implemented to realize one or more of the following advantages. The subject matter can be used to attribute viral growth to certain individuals or selected group. Such attribution can be used for targeted advertising to the selected group or even to the individuals or other individuals that are influenced by the individual or group.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 4A-4B are examples of web pages displaying influential node data.

Like reference symbols in the various drawings indicate like elements.

DETAILED DESCRIPTION

Every community has individuals who influence that community. From a prominent economist's advice on economics to a celebrity buying the latest designer bag, thousands of people pay attention to what influential individuals are doing within their field. However, less attention is paid when an influential individual opines on a topic outside their field. For example, the thousands of individuals that pay attention to the economists on economics would be unlikely to pay attention to the economist's latest jacket purchase.

With communities growing through various social media, influencers are finding the playing field leveling as the Internet allows "word of mouth" in digital form to travel faster than ever before. For example, if the celebrity sends a communication to individuals in her social network that she thought a new designer was worth watching, that communication is likely to be shared with hundreds of thousands of people whom the celebrity does not know. If, however, the economist sent out the same communication to individuals in her social network, the communication would be unlikely to have the same influence for those following fashion. However, if the economist is an actual friend of the celebrity, and the celebrity, in turn, sends the economist's comment to her network, the number of people reached rises.

The ability to determine the influence of certain individuals on a particular topic can reflect who is influencing the target audience of companies from non-profits to entertainment to technology. It can also assist individuals, such as journalists, who are trying to determine what topics in their communications are most popular.

These influencers may or may not be the originators of the communication, but the communication passes through them to their connections, their connections' connections, etc. Influence scores can be assigned to influencers for content about a particular topic that is spread over a network. The score can be, in part, a function of the number of individuals who eventually encounter or engage with a particular communication ("reach"). Once determined, the score can be used to propagate further information about the particular topic in the community. In some implementations, a system aggregates over multiple communications to determine for potential new communications who the key users may be in spreading those communications.

Figure 1:
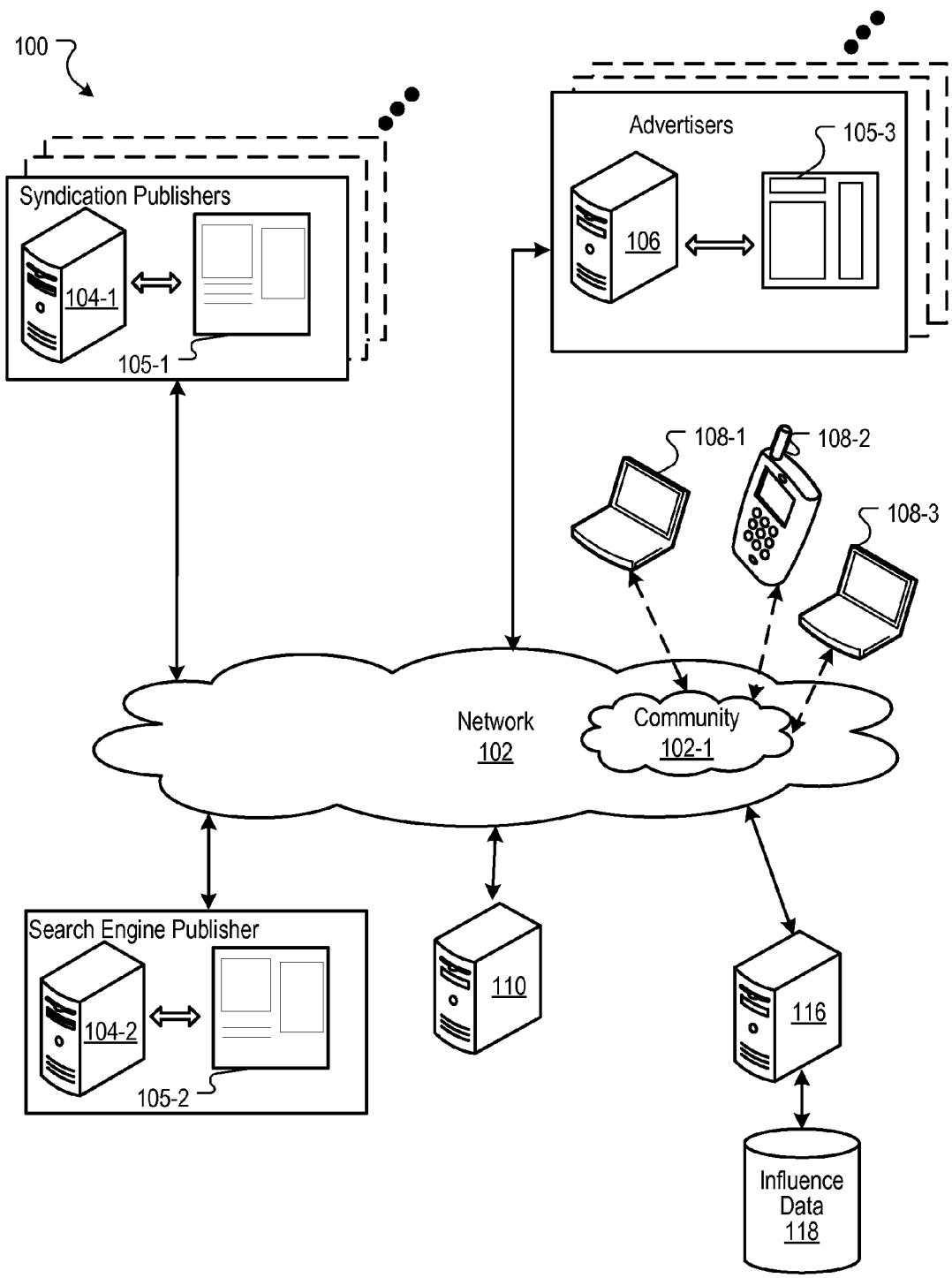
FIG. 1 is a block diagram of an example environment in which influential nodes are determined.

FIG. 1 is a block diagram of an example environment 100 in which influential nodes are determined. A computer network 102, such as the Internet, or a combination of the Internet and one or more wired and wireless networks, connects syndication publishers 104-1, a search engine publisher 104-2, advertisers 106, user devices 108 (including 108-1, 108-2, and 108-3), an advertisement management system 110, and an influence processing system 116. The online environment 100 can connect many publishers and advertisers, as indicated by the phantom figures behind the syndication publisher 104-1 and the advertiser 106.

Each of the user devices 108 is an electronic device that is under control of a user and is capable of requesting and receiving resources 105 (including 105-1-105-3) over the network 102. Example user devices 108 include personal computers, mobile communication devices and other devices that can send and receive data over the network 102. A user device 108 typically includes a user application, such as a web browser or other communication software, to facilitate the sending and receiving of data over the network 102.

The publishers 104 and, optionally, the advertisers 106 can maintain websites. Each website is one or more resource 105 associated with a domain name, and each is hosted by one or more servers. A resource is any data that can be provided by the web site over the network 102 and that is associated with a resource address. Resources include web pages, RSS feeds, images, video, and other multimedia streams, for example. To avoid congestion in the drawings, the resources 105 are represented as web pages; however, the representations of FIG. 1 are inclusive of other types of resources.

As shown in FIG. 1, the network 102 includes a community 102-1. Each of the user devices are shown as having the ability to connect to the community 102-1 through the network 102. The community 102-1 can include one or more social communities, such as a social network or a micro-blog network. Users that belong to the community 102-1 are identified by user profiles, and the users are interconnected based on the user relationships with each other.

The users of the community communicate with each other by various means, such as blog posts and micro-blog posts. A micro-blog can differ from a traditional blog in that its content is typically limited so that it is smaller in size, e.g., one or two sentences, a single photo, etc. Other communications include a share action, a preference designation by the user related to a communication, a status message, inclusion/exclusion from a group of users, and the like.

In a social network, information is spread by users as they tell their friends, or is spread when the information is automatically sent to users that are connected to them. Often times a "viral" growth of a message can be attributed to a certain individual or a selected group of individuals. Information describing the attribution of such viral growth of a public message can be useful to advertisers, social network providers, and even to the users themselves. For example, advertisers can use public messages to determine whether their advertising campaigns are effective; the network providers can use public messages to determine which users are "influential" relative to other users, and to which groups their influence spreads; and users can find the information about the public message interesting and entertaining.

To determine such influence, an influence processing system 116 determines a reach of particular communications from particular users. The influence processing system 116 can store information related to the reach of the communication as influence data 118 and use the influence data 118 to determine an influence score. The influence score can reflect the quantity of users who received the communication. The influence score can also reflect the quality of the reach, as described further below. The influence processing system 116 can be integrated into the community 102-1 or independent of the community 102-1. The influence processing system 116 can provide information to the advertisement management system 110 and others to provide influence score information. In some implementations, users can opt-out of having their communications processed by the influence processing system 116.

Each of the publishers are in data communication with the advertisement management system 110 and together the publishers 104-1 and 104-2 and the advertisement management system 110 facilitate the provisioning of advertisements with the publisher resources 105-1 or 105-2. In particular, the advertisement management system 110 allows advertisers to define targeting rules that take into account attributes of the particular user to provide targeted advertisements for the users. These targeted advertisements can be provided in many different properties, such as the properties of the syndication publisher 104-1 (e.g., web pages, RSS feeds, etc.), search result pages 105-2 of the search engine publisher 104-2, and to users of the community 102-1.

Figure 2:
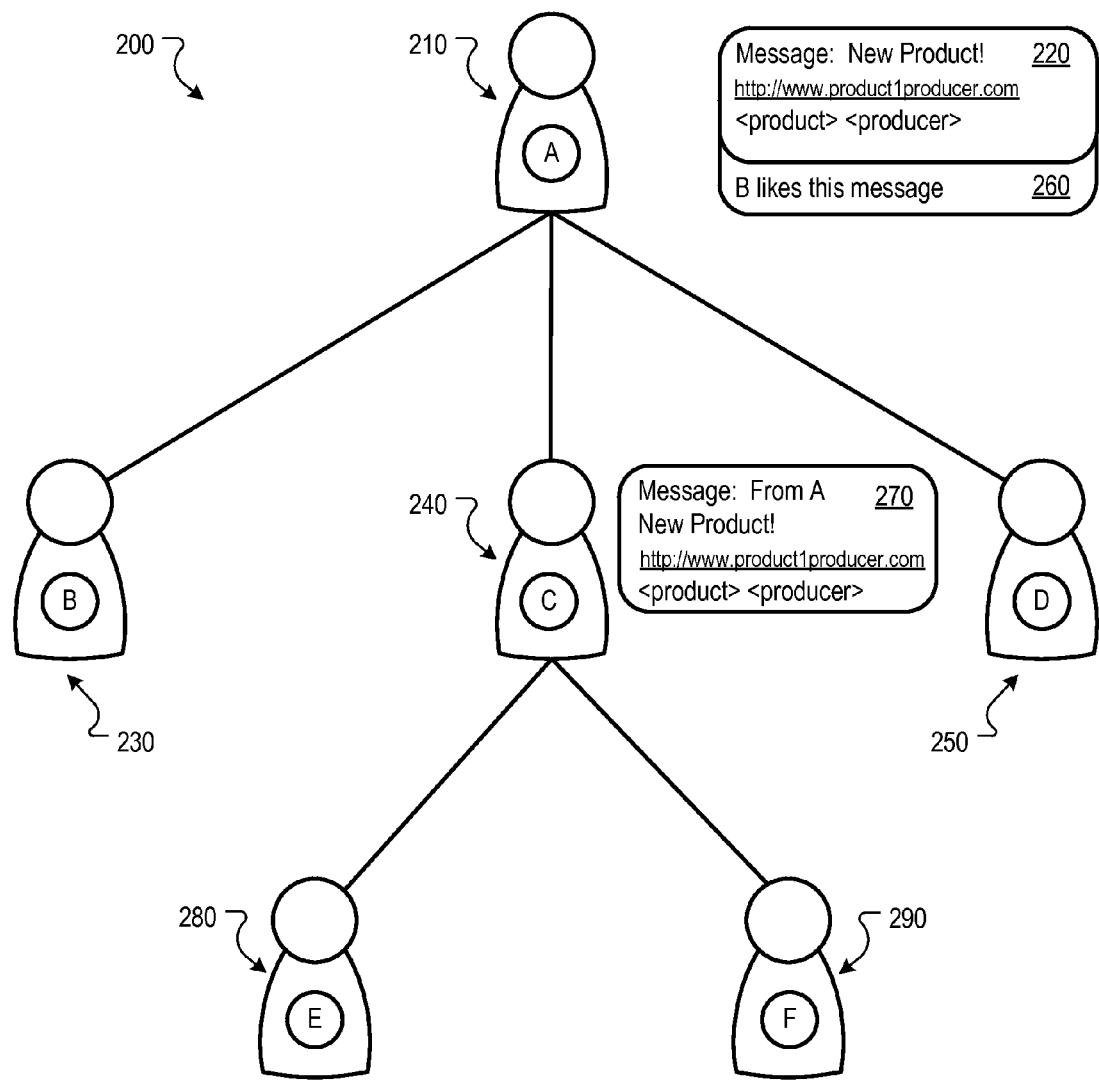
FIG. 2 is an example diagram of influential nodes in a community.

FIG. 2 an example diagram of influential nodes in a community 200. As described above, the community 200 can be a community 102-1 as in FIG. 1 connected with user devices 108 through a network 102 to allow multiple users to interact. Shown here, the community 200 has a first user, Aaron 210 who sends out a communication 220 to three connections, Brian 230, Clay 240, and Drew 250. Each of the three connections interacts with the communication 220. For example, Drew 250 receives and views the communication 220; Brian 230 sends a related communication 260 that is displayed along with the communication 220; and Clay 240 resends the communication 220 to two other connections, Erik 280 and Frank 290.

The example communication 220 relates to a particular product (e.g., a computer device) from a particular producer (e.g., a computer manufacturer). Accordingly, the communication is described in the context of a product and a producer. However, any communication can be analyzed according to the processes described in this written description.

The communication 220 can include a link to a website along with information Aaron 210 generates. The communication 220 has two labels, shown as tags "product" and "producer," that describe the topics associated with the communication 220. In some implementations, the labels can be specified by the user. For example, Aaron 210 can use hash tags to provide labels to the communication 220. In some implementations, the labels can be automatically generated during processing time. For example, the influence data 118 of FIG. 1 can have pre-stored labels for particular topics, including brand names (producers) and products produced by the producers.

In some implementations, the viral component by the influencer can be determined by aggregating over communications. For example, if "product" is a new topic, it may be unknown who the influencers are in regard to the topic "product." Therefore, influencer scores for topics such as "producer" can provide information to determine the likely viral component for the new topic.

The influence score based on the reach of the communication 220 can be determined in various ways. In some implementations, the influence score of the communication 220 can be determined as a sum of all users who have received the message. In this case, five users have now received the message, three from Aaron's connections and two from Clay's connections, and the communication 220 influence score can be, for example, 5. Some implementations of determining the influence score based on a quality of the reach are described below.

Figure 3A:
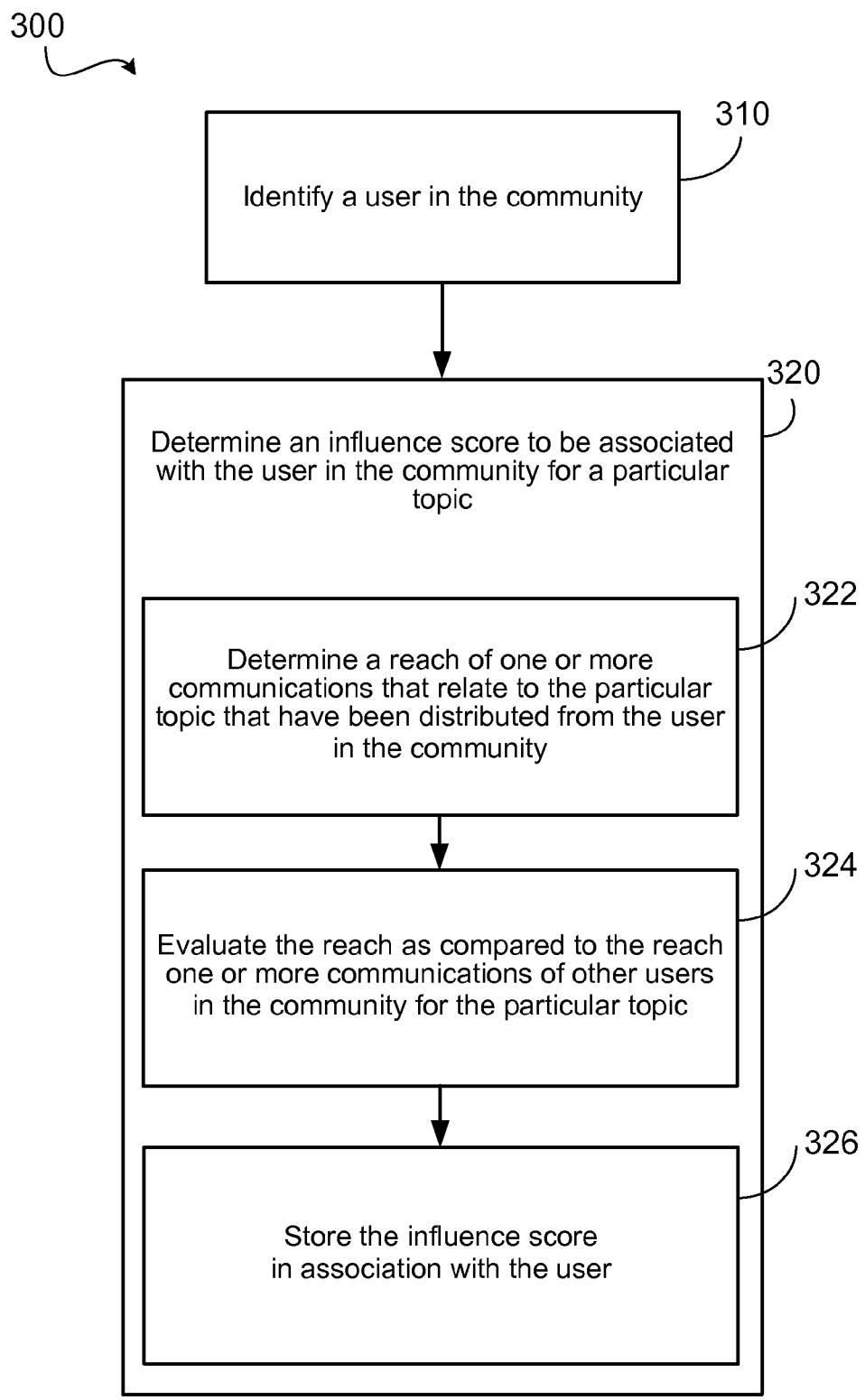
FIG. 3A is a flow chart of an example process for determining an influence score for a user.

FIG. 3A is a flowchart of an example process 300 for determining an influence score for a user in a community. The process can be implemented by a data processing apparatus, such as one or more computer devices as described with respect to FIG. 5.

A user is identified in the community (310). As described above, the user can be an individual that is using a user device 108-1 to communicate as part of a community 102-1. The user can send a communication that is processed by the influence processing system 116. The influence processing system 116 can receive data indicating actions taken by users in the community 102-1 responsive to the communication (e.g., whether a user interacted with (read) a communication, forwarded the communication, deleted the communication without reading it, etc.). In some implementations, the influence processing system 116 can store the communication in the influence data 118, and determine an influence score for the user on a per-communication basis. In other implementations, the influence processing system 116 can determine an influence score for the user on per-topic basis. In this latter implementation, the per-topic basis influence score can be determined in addition to the per-communication influence scores, or instead of the per-communication influence scores.

An influence score to be associated with the user in the community is determined for a particular topic (320). The influence score can be determined using the reach of one or more communications from the user. In some implementations, the one or more communications from the user that can be used to determine the influence score using labels. For example, the one or more communications can be labeled with a topic label that describes a topic associated with the one or more communications. For example, if Aaron 210 has sent one or more communications with the topic label "producer," this label can be used to assist in processing the one or more communications for the particular topic described by the label.

Steps 322-326 describe one example way to determine an influence score. A reach of one or more communications that relate to the particular topic that have been distributed from the user in the community are determined (322). In some implementations, the influence score is a function of the number of people N that actually engage with the content. The influence score can, for example, be used in a function of the expected viral growth of a communication given that user u1 has engaged with it, e.g., $E[N|u1e]$, where the expectation is proportion to the number N and the particular's user influence.

In some implementations, the number N can be determined from two component scores. Higher component scores are given for users that engage with the communication than component scores for users that do not engage with the communication. For example, $N=a1*Np+a2*Ne$, where a1 and a2 are scaling factors and $a2>a1$ so that Ne is weighed more than Np, Ne is the number of users with engaged responses, and Np is the number of users with passive responses.

A user is not considered to engage with a communication when the user receives a communication but does not take an action that indicates an interest in the communication, e.g., does nothing in response that causes, directly or indirectly, further propagation of the communication, deletes the communication without reading the communication, etc. For example, the user may simply delete the communication. An engaged response is when the user takes an action with respect to a received communication. For example, the user can share the communication, provide a positive feedback designation (e.g., a "+" indicator), or click on a link provided in the communication, each of which constitutes an engages response.

In some implementations, the influence score can be determined by determining a quality of the reach. For example, the quality of the reach can be measured based on actions taken by the one or more other users in the community responsive to the distribution by the user, and by the number of passive responses. As described above, the actions a user can take to the communication 220 can include sending the communication 220 to other individuals in the community 200, sending a related communication 260, clicking on a link in the communication 220, and viewing the communication 220.

The reach can also be measured by considering additional factors. For example, in some implementations, the quality of the reach can also be measured by demographics of the one or more users in the community responsive to the distribution by the user. For example, reach among male users and female users can be calculated.

In some implementations, the quality of the reach can be measured based on a geographic location of the one or more users in the community responsive to the distribution by the user. For example, if the communication 220 in FIG. 2 is for a product that is local to a restaurant in Chesterfield, Mo., the number of users in the community 200 in and around Chesterfield who are responsive to the communication 220 can determine the quality of the reach.

In some implementations, the quality of the reach can be measured based on a speed of responsiveness or distribution of the one or more users in the community. For example, if the communication 220 announces a new dessert at the Chesterfield restaurant, the quality of the reach can be measured according to the speed of the responsiveness of the other users in the community 200. For example, if 100 users respond in some way to the communication 220 in a day, the quality of the reach can be higher than if the same 100 users respond to the communication 220 in a week.

In some implementations, the topic includes one or more sub-topics, and determining the influence score of the user for a topic includes determining a sub-topic influence score for the user for each of the sub-topics. For example, Clay 240 can have sub-topic influence scores for the St. Louis Arch, the St. Louis Cardinals, and the Chesterfield restaurant. Each of these topics can be sub-topics for the topic St.

Louis. Each of the sub-topics scores can be included in determining Clay's influence score for St. Louis.

The reach is evaluated by comparing to the reach of one or more other users in the community for the particular topic (324). In some implementations, the reach is evaluated as a strict comparison for each user in regard to each topic. For example, both Aaron 210 and Clay 240 have distributed the communication 220. If the reach of a user is based only the number of users that receive a communication that the user sends, then from FIG. 2, the reach of Aaron 210, (e.g., 5), is greater than the reach of Clay 240 (e.g., 2). In some implementations, the reach can be evaluated in part through actions unrelated to the direct actions of the user. For example, the reach can be determined based on how often the user is mentioned in a communication related to the topic. Thus, if in all communications regarding a particular topic, the user is mentioned in 2% of the communications, the percentage is incorporated into the influence score. Typically, the higher the percentage, the higher the influence score. Based on the evaluation, the influence score for the user is determined.

The influence score is stored in association with the user (326). In reference to FIG. 1, the influence score can be stored with the influence data 118. The influence score can be stored as a part of the community 102-1. In some implementations, the influence score can be displayed in reference to the user. For example, the user can belong to a social network in the community 102-1 in which the user has a profile page. The influence score can be displayed on the user's profile page.

Figure 3B:
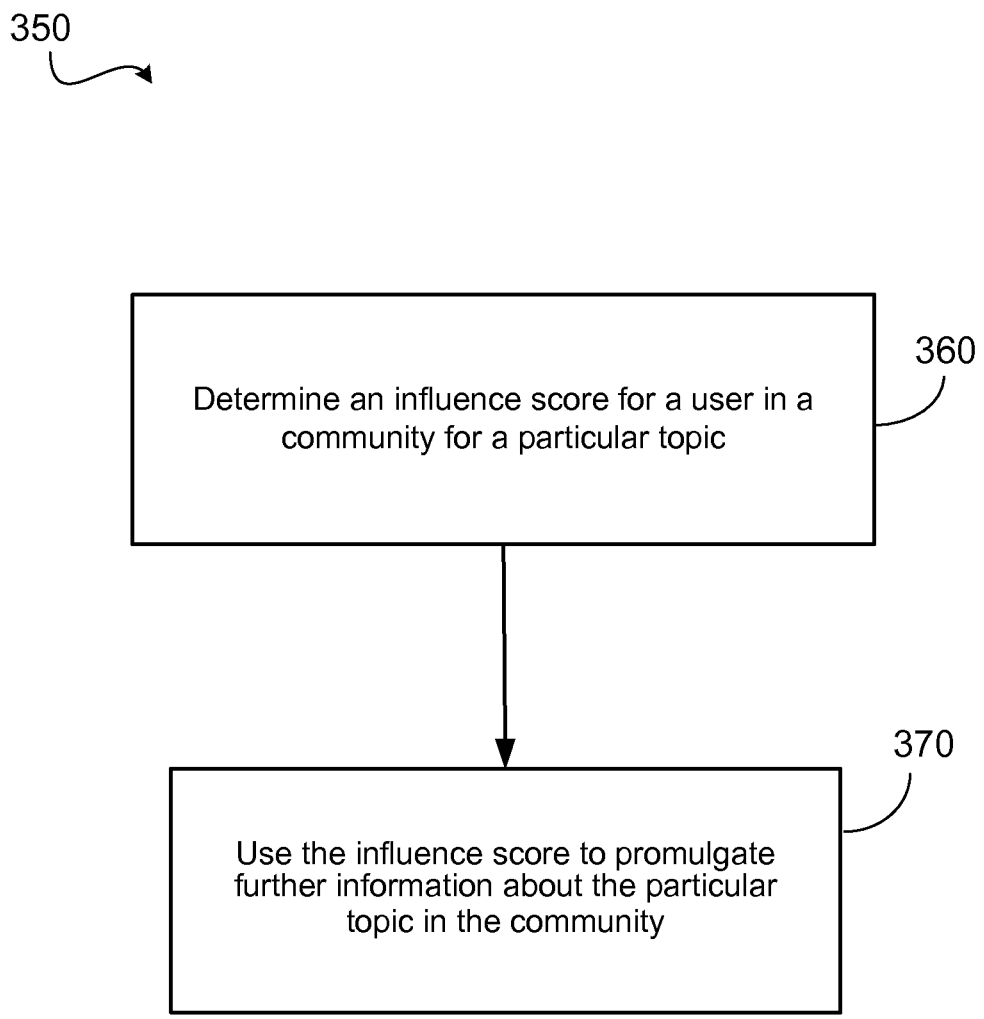
FIG. 3B is a flow chart of an example process for using a determined influence score.

FIG. 3B is a flow chart of an example process 350 for using a determined influence score. The process can be implemented by a data processing apparatus, such as one or more computer devices as described with respect to FIG. 5.

An influence score for a user in a community is determined for a particular topic (360). In some implementations, the influence score can be determined according to the example process 300 of FIG. 3A, and determined from multiple communications related to the topic and aggregated (e.g., to determine a central tendency).

The influence score is used to promulgate further information about the particular topic in the community (370). In some implementations, the influence processing system 116 can provide information from the influence data 118. A search query can be provided to a search engine regarding information relating to the particular topic. Information related to an influencer in the community 102-1 can be provided as a search result. The influence score of the influencer can be used by the search engine data so that information from an influencer with a high score is considered a trusted source for content. This score can also be used by the search engine to increase the relevance of the information related to the influencer in the search results. In some implementations, a list of influencers can be provided for a particular topic so that an influencer's information can be searched for information relating to the particular topic.

FIG. 4A is an example of a web page 400 displaying influential node data for a particular advertiser, e.g. a producer associated with the account ID 420. The web page 400 displays a top influencer list 410 for a particular topic, including an influencer column 410A, a score column 410B, and a ranking column 410C. The web page 400 also displays the particular account ID 420 for the account holder. Other topics are displayed in a topic label list 430. The web page 400 is presented to the account holder of account ID 420 so that the company can determine influencers in topics relating to the company. For example, the labels followed include two of its products (Product1 and Product2), itself, a competitor ("Other producer"), and its market generally ("Product Market").

In some implementations, influencers can be determined using a threshold. For example, a threshold of X for an influence score can be set so that only users with an influence score above X can be determined influencers. In some implementations, an average reach associated with more than one of the one or more communications that are distributed by the user and related to the particular topic can be determined.

In some implementations, a predetermined number of most influential users for the particular topic can be identified based on a collection of influence scores for the most influential users for the particular topic. For example, the top influencer list 410 shows the most influential users in the influencer column 410A. The top influencer list 410 can present a user as an expert with respect to the particular topic. For example, the top influencers for a label associated with Product 1 are shown in the web page 400. Influencer A, for example user Aaron 210 from FIG. 2, can be considered the expert for Product 1. In some implementations, all top influencers (e.g., the top N influencers) can be presented as experts.

An expert can be identified in various ways. For example, an expert can be the user who provides content cited from an individual outside the community. Individuals or entities outside the community can have an associated influence score based on communications containing information cited to them and the reach of those communications. For example, Albert Einstein, a deceased entity, will not have an account in the community 102-1. However, his published work can be cited in communications as his theories are proven or disproven. Thus, Einstein can be assigned an influence score by attribution of influence scores of users within the community that are acting on or creating communications related to his work. Alternatively or additionally, the influence score can be determined from a reach of communications that relate to a topic (e.g., physics) and the entity (Einstein) relative to the reach of other communications that related to the topic and other entities (e.g., Bohr, Stern, etc.).

By way of another example, an expert can be a user of the community whose content is cited by other members of the community. For example, an author, who is also a member of the community, has an account in the community 102-1. The author may not post messages, but the author's work on a particular subject is often cited in communication that identify the author. Thus the author can be assigned an influence score by attribution of influence scores of users within the community that are acting on or creating communications related to his work.

In some implementations, the influence scores can change over time. For example, the reach of the one or more communications can change over time. This change can be determined in order to update influence scores.

FIG. 4B is an example of web page 440 displaying influential node data. The web page 440 displays topic scores 450 for a particular user, including a topic 450A, a score 450B, and a ranking 450C, and is displayed to the user when the user logs into his or her account. The web page 440 also displays a particular account ID 460 for the account holder monitoring his own influence score. The web page 440 can display a followers list 480, where the contacts of the user can be listed accordingly: the first degree followers can be direct connections to the user (e.g., Brian 230, Clay 240, and Drew 250); the second degree followers can be connections of the direct connections to the user (e.g., Erik 280 and Frank 290); and the third degree connections can be connections of the second degree followers. The topics 450 can be varied. For example, A's account shows technology, parenting, and wristwatch topics. These topics mirror a popular blogger who publicly posts about parenting styles and has a specialized blog regarding expensive wristwatches. For authors who are paid to provide information and become well-known in certain fields, this web page 440 can provide information to let them know which topics in which they can be considered influencers and which topics they need to publish more.

Topics CES and Computers can be identified as similar topics to the particular topic of firmware. In some implementations, the influence score of the user for the particular topic can be associated with one or more influence scores of the user for similar topics. This association can provide further data to influence scores for each of the topics.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 5:
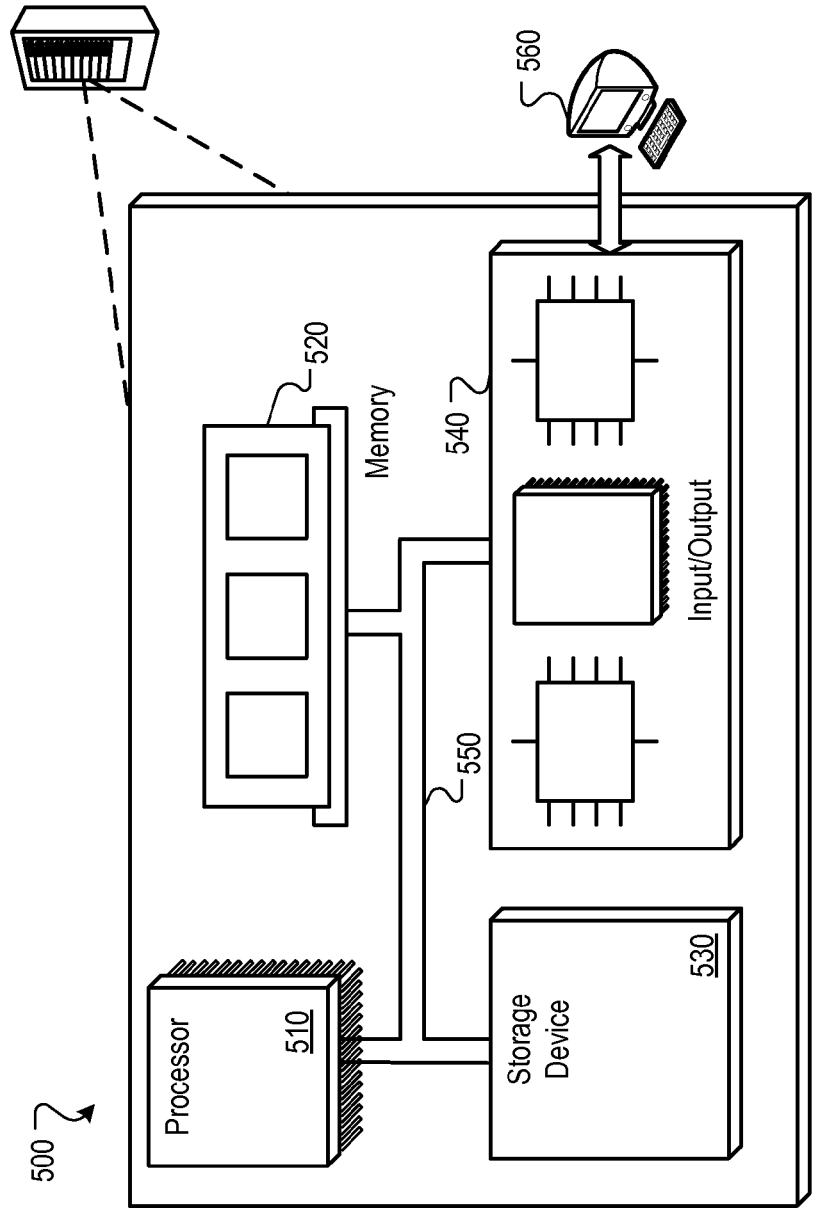
FIG. 5 is an example of a block diagram of a programmable processing system.

An example of one such type of computer is shown in FIG. 5, which shows a block diagram of a programmable processing system (system) 510 which shows a block diagram of a data processing apparatus system. The system 500 can be utilized to implement the systems and methods described herein. The architecture of the system 500 can, for example, be used to implement a computer client, a computer server, or some other computer device.

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

A number of embodiments of the invention have been described. Nevertheless, it will be understood that various modifications may be made without departing from the spirit and scope of the invention. For example, individuals in the community can be allowed to vote for influencers for a particular topic. Accordingly, other embodiments are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   identifying, by one or more processors, a user in a community;
   determining, by the one or more processors and for each particular topic of a plurality of topics:
   communications that have been distributed from the user to other users in the community and that belong to the particular topic, and wherein the particular topic has only a subset of all communications distributed from the user;
   determining, by the one or more processors, a first reach of the communications that relate to the particular topic, wherein the first reach represents a first quantity of users who received the communications;
   determining, by the one or more processors, other communications that relate to the particular topic that have been distributed from a first set of users in the community to a second set of users that is different from the first set of users in the community for the particular topic, wherein the first set of users does not include the user;
   determining, by the one or more processors, a second reach of the other communications that relate to the particular topic;
   determining, by the one or more processors, an influence score to be associated with the user for the particular topic, the determination based on comparing the first reach to the second reach, wherein the second reach represents a second quantity of users who received the other communications;

storing, by the one or more processors, the influence score for the particular topic in association with the user; and determining, by the one or more processors and based on the influence score associated with the user, that the user is an expert with respect to at least one of the particular topics.

2. The method of claim 1 wherein determining the influence score includes determining a quality of the first reach, and wherein the quality of the first reach is based on one or more of:

demographics of one or more users in the community responsive to the distribution by the user;

a geographic location of the one or more users in the community responsive to the distribution by the user; and a speed of responsiveness or distribution of the one or more users in community.

3. The method of claim 1 further comprising identifying a predetermined number of most influential users for the particular topic based on a collection of influence scores for the most influential users for the particular topic.

4. The method of claim 1 further comprising:

identifying one or more similar topics to the particular topic; and associating the influence score of the user for the particular topic with one or more influence scores of the user for similar topics.

5. The method of claim 1 further comprising:

labeling the one or more communications distributed by the user in the community with a topic label that describes a topic associated with the one or more communications; and evaluating the reach of the one or more communications from the user that have a topic label that is the same as the particular topic.

6. The method of claim 1 wherein the community is a social community.

7. The method of claim 1 wherein the community comprises a plurality of social communities, including one or more of a social network and a micro-blog network.

8. The method of claim 1 wherein a communication of the one or more distributed communications is selected from the group comprising a micro-blog post, a share action, a blog post, a status message, and an update to a previous communication from the user.

9. The method of claim 1 wherein a communication of the one or more distributed communications is selected from the group comprising a preference designation by the user and a positive feedback indicator.

10. The method of claim 1 further comprising determining an average reach associated with more than one of the one or more communications that are distributed by the user and relate to the particular topic.

11. The method of claim 1 where the particular topic includes one or more sub-topics and where determining the influence score of the user for topic includes determining a sub-topic influence score for the user for each of the sub-topics.

12. The method of claim 1, wherein determining a first reach comprises:

determining a first number of one or more other users that engaged with a communication distributed by the user;

determining a second number of one or more other users that did not engage with the communication;

determining the reach based on a function that weighs the first number more than the function weighs the second number.

13. A system, comprising:

one or more computers in data communication;

a memory storage system in data communication with the one or more computers and storing instructions executable by the one or more computers that upon such execution cause the one or more computers to perform operations comprising:

identifying a user in a community;

determining for each particular topic of a plurality of topics:

communications that have been distributed from the user to other users in the community and belong to the particular topic, and wherein the particular topic has only a subset of all communications distributed from the user;

determining a first reach of the communications that relate to the particular topic, wherein the first reach represents a first quantity of users who received the communications;

determining other communications that relate to the particular topic that have been distributed from a first set of users in the community to a second set of users that is different from the first set of users in the community for the particular topic, wherein the first set of users does not include the user;

determining a second reach of the other communications that relate to the particular topic;

determining an influence score to be associated with the user for the particular topic, the determination based on comparing the first reach to the second reach:

wherein the second reach represents a second quantity of users who received the other communications; storing the influence score for the particular topic in association with the user; and determining, based on the influence score associated with the user, that the user is an expert with respect to at least one of the particular topics.

14. The system of claim 13, wherein determining a reach comprises:

determining a first number of one or more other users that engaged with a communication distributed by the user;

determining a second number of one or more other users that did not engage with the communication;

determining the reach based on a function that weighs the first number more than the function weighs the second number.

15. The system of claim 13, wherein determining the influence score includes determining a quality of the first reach, and wherein the quality of the first reach is based on one or more of:

demographics of one or more users in the community responsive to the distribution by the user;

a geographic location of the one or more users in the community responsive to the distribution by the user; and a speed of responsiveness or distribution of the one or more users in the community.

16. The system of claim 13, further comprising:

identifying one or more similar topics to the particular topic; and associating the influence score of the user for the particular topic with one or more influence scores of the user for similar topics.

17. Software stored in a non-transitory computer readable medium storage device and storing instructions executable by one or more computers that upon such execution cause the one or more computers to perform operations comprising:
- identifying a user in a community;
- determining for each particular topic of a plurality of topics:
- communications that have been distributed from the user to other users in the community and that belong to the particular topic, and wherein the particular topic has only a subset of all communications distributed from the user;
- determining a first reach of the communications that relate to the particular topic, wherein the first reach represents a first quantity of users who received the communications;
- determining one or more other communications that relate to the particular topic that have been distributed from a first set of users in the community to a second set of users that is different from the first set of users in the community for the particular topic, wherein the first set of users does not include the user;
- determining a second reach of the one or more other communications that relate to the particular topic;
- determining, by the one or more processors, an influence score to be associated with the user for the particular topic, the determination based on comparing the first reach to the second reach, wherein the second reach represents a second quantity of users who received the other communications;
- storing the influence score for the particular topic in association with the user; and
- determining, by the one or more processors and based on the influence score associated with the user, that the user is an expert with respect to at least one of the particular topics.

18. The software of claim 17, wherein determining a first reach comprises:
- determining a first number of one or more other users that engaged with a communication distributed by the user;
- determining a second number of one or more other users that did not engage with the communication;
- determining the reach based on a function that weighs the first number more than the function weighs the second number.

19. The software of claim 17, wherein determining the influence score includes determining a quality of the first reach, and wherein the quality of the first reach is based on one or more of:
- demographics of one or more users in the community responsive to the distribution by the user;
- a geographic location of the one or more users in the community responsive to the distribution by the user; and
- a speed of responsiveness or distribution of the one or more users in the community.

20. A method, comprising:
- determining, by one or more processors and for each particular topic of a plurality of topics:
- a first reach of one or more first communications that have been distributed from a user to other users in a community and that belong to the particular topic that has only a subset of all communications distributed from the user, wherein the first reach represents a first quantity of users who received the communications;
- determining, by the one or more processors, other communications that relate to the particular topic that have been distributed from a first set of users in the community to a second set of users that is different from the first set of users in the community for the particular topic, wherein the first set of users does not include the user;
- determining, by the one or more processors, a second reach of the other communications that relate to the particular topic, wherein the second reach represents a second quantity of users who received the other communications;
- determining, by the one or more processors, an influence score to be associated with the user for the particular topic, the determination based on comparing the first reach to the second reach be associated with the entity for the particular topic;
- storing, by the one or more processors, the influence score or the particular topic in association with the entity; and
- determining, by the one or more processors and based on the influence score associated with the user, that the user is an expert with respect to at least one of the particular topic.

21. The method of claim 20 wherein determining the influence score includes determining a quality of the first reach, and wherein the quality of the first reach is based on one or more of:
- demographics of one or more users in the community responsive to the distribution by the user;
- a speed of responsiveness or distribution of the one or more users in the community in response to the first communication.

22. The method of claim 20, wherein determining a first reach comprises:
- determining a first number of one or more other users that engaged with the first communication;
- determining a second number of one or more other users that did not engage with the first communication;
- determining the reach based on a function that weighs the first number more than the function weighs the second number.

* * * * *